US012691840B2

(12) United States Patent
Aso

(10) Patent No.:  US 12,691,840 B2
(45) Date of Patent:        Jul. 28, 2026

(54) VEHICLE FRONT SECTION STRUCTURE

(71) Applicant: TOYOTA JIDOSHA KABUSHIKI KAISHA, Toyota (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 18/420,765

(22) Filed: Jan. 24, 2024

(65) Prior Publication Data

US 2024/0317164 A1      Sep. 26, 2024

(30) Foreign Application Priority Data

Mar. 22, 2023    (JP) ................................. 2023-045539

(51) Int. Cl.
B60R 19/02          (2006.01)
B60Q 5/00          (2006.01)
B60R 19/18          (2006.01)
B60R 19/52          (2006.01)

(52) U.S. Cl.
CPC .............. B60R 19/023 (2013.01); B60Q 5/00 (2013.01); B60R 19/18 (2013.01); B60R 19/52 (2013.01); B60R 2019/527 (2013.01)

(58) Field of Classification Search
CPC ....... B60R 19/023; B60R 19/18; B60R 19/52; B60R 2019/527; B60Q 5/00
USPC ....................................................... 293/115
See application file for complete search history.

(56) References Cited

U.S. PATENT DOCUMENTS

| | | | | |
|---|---|---|---|---|
| 3,134,585 A | * | 5/1964 | Trask ......................... | F16F 1/40 |
| | | | | 267/141.1 |
| 3,694,018 A | * | 9/1972 | Levering ................. | B60R 19/18 |
| | | | | 267/140 |
| 4,597,601 A | * | 7/1986 | Manning ................. | B60R 19/18 |
| | | | | 293/133 |
| 5,137,313 A | * | 8/1992 | Teig .......................... | B60P 7/16 |
| | | | | 267/140 |
| 5,806,901 A | * | 9/1998 | Tennyson ................ | B60R 19/30 |
| | | | | 293/122 |

(Continued)

FOREIGN PATENT DOCUMENTS

| | | | | |
|---|---|---|---|---|
| FR | 2902058 A1 | * | 12/2007 | ............. B60R 19/30 |
| JP | 2004330852 A | * | 11/2004 | |

(Continued)

*Primary Examiner* — Hilary L Gutman

(74) *Attorney, Agent, or Firm* — SOLARIS Intellectual Property Group, PLLC

(57) ABSTRACT

A vehicle front section structure including: a horn, the horn being provided at a vehicle front section; a bumper absorber, the bumper absorber being provided at a vehicle lower side of the horn, and the bumper absorber being capable of absorbing impact energy due to an impact load that has been input from a vehicle front side; and a grill, the grill being disposed at a vehicle lower side of the bumper absorber at a bumper cover configuring a design at a vehicle front end, and an opening portion being formed in the grill, wherein the bumper absorber is configured to include: a through-hole, the through-hole penetrating along a vehicle up-down direction, and an elastic body, the elastic body being is provided within the through-hole, and the elastic body having a hollow shape penetrating along the vehicle up-down direction.

8 Claims, 6 Drawing Sheets

(56)     References Cited

U.S. PATENT DOCUMENTS

| | | | | |
|---|---|---|---|---|
| 2005/0046206 A1 * | 3/2005 | Ohno | .................. | B60R 19/18 |
| | | | | 293/120 |
| 2016/0039375 A1 * | 2/2016 | Okuyama | .......... | B60R 11/0217 |
| | | | | 293/117 |
| 2017/0050509 A1 * | 2/2017 | Aizawa | .............. | B60K 11/085 |
| 2020/0017045 A1 | 1/2020 | Gao | | |
| 2021/0237673 A1 | 8/2021 | Tokuyama et al. | | |
| 2022/0063529 A1 * | 3/2022 | Wright | ................ | B60R 19/023 |

FOREIGN PATENT DOCUMENTS

| | | | | | | |
|---|---|---|---|---|---|---|
| JP | 4292911 | B2 | * | 7/2009 | ............ | B60R 19/18 |
| JP | 2010163075 | A | * | 7/2010 | | |
| JP | 2015096357 | A | * | 5/2015 | | |
| JP | 5966413 | B2 | * | 8/2016 | | |
| JP | 2017039368 | A | * | 2/2017 | | |
| JP | 6182596 | B2 | * | 8/2017 | ............ | B60Q 5/00 |
| JP | 2018127060 | A | * | 8/2018 | | |
| JP | 6648680 | B2 | * | 2/2020 | | |
| JP | 6699578 | B2 | * | 5/2020 | | |
| JP | 2020104805 | A | * | 7/2020 | | |
| JP | 2021-120241 | A | | 8/2021 | | |
| JP | 2024073067 | A | * | 5/2024 | | |
| JP | 2024164885 | A | * | 11/2024 | | |

* cited by examiner

VEHICLE FRONT SECTION STRUCTURE

CROSS-REFERENCE TO RELATED APPLICATION

This application is based on and claims priority under 35 USC 119 from Japanese Patent Application No. 2023-045539, filed on Mar. 22, 2023, the disclosure of which is incorporated by reference herein.

BACKGROUND

Technical Field

The present disclosure relates to a vehicle front section structure.

Related Art

Japanese Patent Application Laid-Open (JP-A) No. 2018-127060, for example, discloses technology in which a crosspiece is provided at a grill at a vehicle front side of a horn, and performance of the horn is secured through the crosspiece, even in a state in which a grill shutter is closed.

However, in Japanese Patent Application Laid-Open (JP-A) No. 2018-127060, since the crosspiece is formed at the grill, constraints are imposed on design.

SUMMARY

In consideration of the aforementioned circumstances, an object of the present disclosure is to provide a vehicle front section structure that is capable of securing performance of a horn without constraints being imposed on design.

A vehicle front section structure according to a first aspect of the present disclosure includes: a horn that is provided at a vehicle front section; a bumper absorber that is provided at a vehicle lower side of the horn and that is capable of absorbing impact energy due to an impact load that has been input from a vehicle front side; and a grill that is disposed at a vehicle lower side of the bumper absorber at a bumper cover configuring a design at a vehicle front end, and in which an opening portion is formed, wherein the bumper absorber is configured to include: a through-hole that penetrates along a vehicle up-down direction, and an elastic body that is provided within the through-hole and that has a hollow shape penetrating along the vehicle up-down direction.

In the vehicle front section structure according to the first aspect of the present disclosure, the horn, the bumper absorber, and the grill are provided at the vehicle front section. The bumper absorber is provided at the vehicle lower side of the horn, and impact energy due to an impact load that has been input from the vehicle front side can be absorbed by the bumper absorber. Further, the grill is disposed at the vehicle lower side of the bumper absorber at the bumper cover configuring the design at a vehicle front end, and the opening portion is formed at the grill. Namely, the bumper absorber is provided between the horn and the grill.

In the present disclosure, the bumper absorber is configured to include the through-hole and the elastic body. The through-hole is formed penetrating along the vehicle up-down direction, and the hollow elastic body that penetrates along the vehicle up-down direction is provided within the through-hole. Consequently, sound of the horn can pass through the bumper absorber through the elastic body.

Generally, sound of a horn is transmitted to a vehicle outside through an opening portion formed in a grill, but in the present disclosure, the bumper absorber is provided between the horn and the grill, as described above. Consequently, in the present disclosure, by providing the through-hole that penetrates through the bumper absorber along the vehicle up-down direction, and providing the hollow elastic body that penetrates along the vehicle up-down direction within the through-hole, sound of the horn is transmitted to the vehicle outside through the elastic body and from the opening portion that is formed at the grill.

Thus, by enabling sound of the horn disposed at a vehicle upper side of the bumper absorber to be transmitted through the opening portion of the grill disposed at the vehicle lower side of the bumper absorber, it becomes unnecessary to form a grill (a so-called upper grill) for transmitting sound of the horn, at the vehicle upper side of the bumper absorber. Namely, in the present disclosure, performance of the horn can be secured without constraints being imposed on design due to forming of an upper grill.

A vehicle front section structure according to a second aspect of the present disclosure is the vehicle front section structure according to the first aspect, wherein the elastic body is capable of absorbing a portion of the impact load that has been input from the vehicle front side.

In the vehicle front section structure according to the second aspect of the present disclosure, the elastic body absorbs a portion of the impact energy due to the impact load that has been input from the vehicle front side, whereby an impact energy absorption amount that has been reduced due to formation of the through-hole at the bumper absorber can be supplemented.

A vehicle front section structure according to a third aspect of the present disclosure is the vehicle front section structure according to the first aspect, wherein the elastic body has a cylindrical shape.

In the vehicle front section structure according to the third aspect of the present disclosure, the elastic body is formed so as to have a cylindrical shape. Compared to a case in which the elastic body has a square tube shape, for example, propagation efficiency of propagating sound of the horn can be improved.

The vehicle front section structure according to the first aspect of the present disclosure can secure performance of a horn without constraints being imposed on design.

BRIEF DESCRIPTION OF THE DRAWINGS

Exemplary embodiments of the present invention will be described in detail based on the following figures, wherein.

DETAILED DESCRIPTION

A vehicle front section structure according to an exemplary embodiment of the present disclosure will be explained, with reference to the drawings. It should be noted that arrow UP, which is appropriately illustrated in the respective drawings, indicates a vehicle upper side, arrow FR indicates a vehicle front side, and arrow RH indicates a right side in a vehicle width direction (left-right direction). Further, in the following explanation, in cases in which front-rear, up-down, and left-right directions are referred to without any particular notation to the contrary, these respectively indicate front and rear in a vehicle front-rear direction, up and down in a vehicle up-down direction, and left and right when facing in a progression direction.

Configuration of Vehicle Front Section

First, a configuration of a vehicle to which the vehicle front section structure according to the present exemplary embodiment has been applied will be explained.

Figure 1:
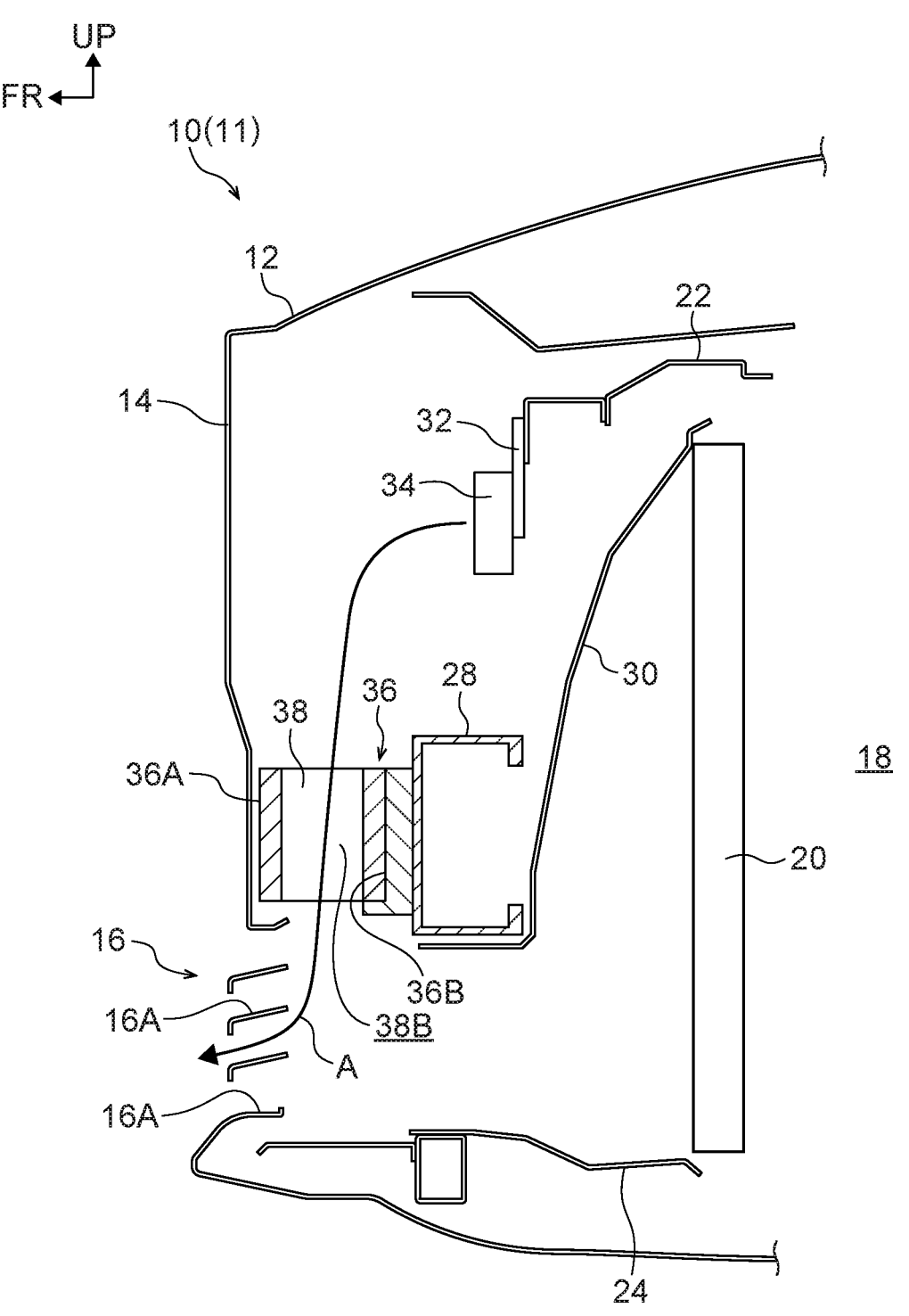
FIG. 1 is a schematic cross-sectional view taken along a vehicle up-down direction and a vehicle front-rear direction of a vehicle to which a vehicle front section structure according to the present exemplary embodiment has been applied.

As illustrated in FIG. 1, a bumper cover 14 configuring a design at a vehicle front end is provided at a front end section 12 of a vehicle 11 to which the vehicle front section structure 10 according to the present exemplary embodiment has been applied. A grill 16 is provided at a lower portion of the bumper cover 14, opening portions 16A extend along the vehicle width direction at the grill 16, and the bumper cover 14 is penetrated in the vehicle front-rear direction by the opening portions 16A.

A power unit room 18 is provided at a vehicle rear side of the bumper cover 14, and, although not illustrated in the drawing, a drive device of the vehicle 11, such as an engine, a motor or the like, is installed within the power unit room 18. A radiator 20 is provided at a vehicle front side of the drive device. A radiator support upper 22 is provided at a vehicle upper side of the radiator 20, and a radiator support lower 24 is provided at a vehicle lower side of the radiator 20. The radiator 20 is fixed to the radiator support upper 22 and the radiator support lower 24.

Although not illustrated in the drawings, front side members are respectively extended along the vehicle front-rear direction at both vehicle width direction outer sides of the power unit room 18. A bumper reinforcement 28 is spanned along the vehicle width direction between front end portions of the front side members, and the radiator 20 is disposed at a vehicle rear side of the bumper reinforcement 28.

A duct 30 is provided at a front end of the radiator support upper 22, between the front end of the radiator support upper 22 and the bumper reinforcement 28. Outside air can flow into the power unit room 18 through the duct 30, and the drive device provided within the power unit room 18 can be cooled. Attachment pieces 32 are respectively suspended at the left and right in the vehicle width direction at an open end of the duct 30, and a horn 34 is attached to each of the attachment pieces 32.

Further, a bumper absorber 36 is provided between the bumper cover 14 and the bumper reinforcement 28. The bumper absorber 36 is capable of absorbing impact energy due to an impact load input from the vehicle front side. Furthermore, as a material of the bumper absorber 36, for example, a polypropylene foamed body (so-called foamed polypropylene) is used, but the material is not limited thereto, as long as it is a material having a high impact absorption property.

Figure 2A:
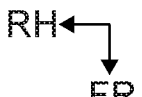
FIG. 2A is a plan view schematically illustrating relevant portions of the vehicle to which the vehicle front section structure according to the present exemplary embodiment has been applied.
Figure 2A:
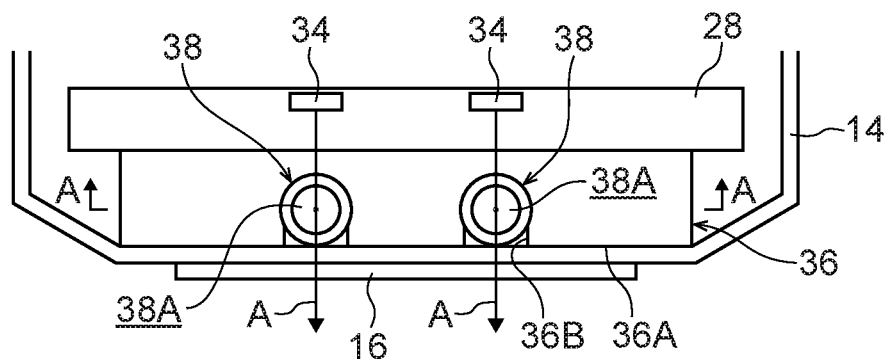
Figure 2B:
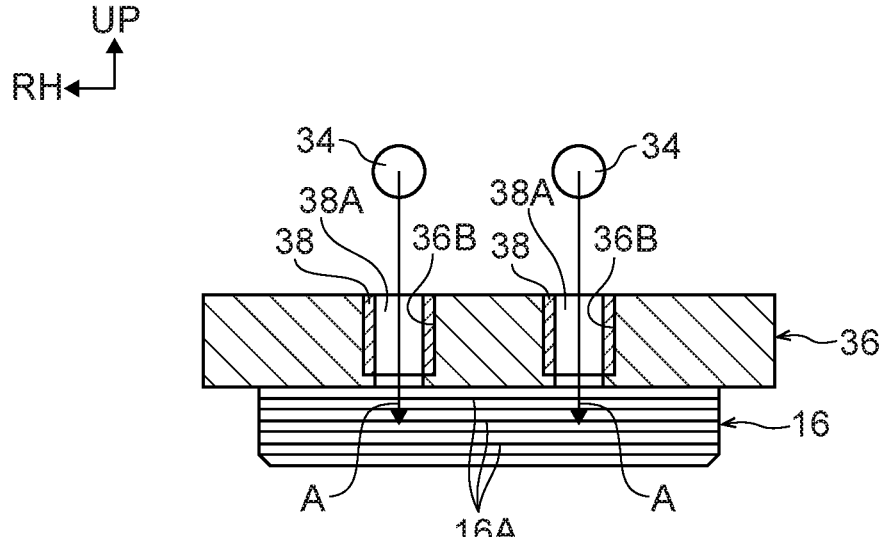
FIG. 2B is a front view schematically illustrating relevant portions of the vehicle to which the vehicle front section structure according to the present exemplary embodiment has been applied.

As illustrated in FIGS. 2A and 2B, the bumper absorber 36 is in the shape of a prism. A dimension of the bumper absorber 36 in the vehicle up-down direction is set according to a dimension of the bumper reinforcement 28, and is set to be slightly shorter than that of the bumper reinforcement 28, taking manufacturing dimensional tolerance into consideration. Further, a dimension in the vehicle width direction of the bumper absorber 36 is set to be within a range, of the bumper cover 14, that is formed substantially parallel to the bumper reinforcement 28.

In this regard, FIG. 2A is a plan view schematically illustrating relevant portions of the vehicle 11 to which the vehicle front section structure 10 according to the present exemplary embodiment has been applied. Further, FIG. 2B is a front view schematically illustrating relevant portions of the vehicle 11, but, in order to make transmission paths of sound of the horns 34 understood, a cross-section taken along line A-A in FIG. 2A is illustrated with respect to the bumper absorber 36.

As illustrated in FIGS. 2A and 2B, concave portions (through-holes) 36B are formed at positions corresponding to front and lower sides of the horns 34 at a front face 36A of the bumper absorber 36. The concave portions 36B substantially have a U-shape with openings at the vehicle front side in plan view, and penetrate along the vehicle up-down direction.

A cylindrical elastic member (elastic body) 38 can be fitted into each concave portion 36B. Thus, a rear wall of the concave portion 36B is formed in accordance with an outside diameter dimension of the elastic member 38. The elastic member 38 is formed of resin, rubber, or the like, and is capable of absorbing impact energy due to an impact load. Further, the elastic member 38 is fixed within the concave portion 36B by adhesion or the like. It should be noted that the elastic members 38 and the bumper absorber 36 may be integrally molded, depending on the material.

Operation and Effects of Vehicle Front Section

Next, operation and effects of the vehicle 11 to which the vehicle front section structure 10 according to the present exemplary embodiment has been applied will be explained.

As illustrated in FIG. 1, the front section of the vehicle 11 in the present exemplary embodiment includes the horns 34, the bumper absorber 36, and the grill 16, and the bumper absorber 36 is provided at the vehicle lower side of the horns 34. Impact energy due to an impact load input from the vehicle front side can be absorbed by the bumper absorber 36. Further, the opening portions 16A are formed at the grill 16, and the grill 16 is disposed at the vehicle lower side of the bumper absorber 36 at the bumper cover 14. Namely, the bumper absorber 36 is provided between the horns 34 and the grill 16.

In this regard, in the present exemplary embodiment, the concave portions 36B that penetrate along the vehicle up-down direction are formed at the bumper absorber 36, and the hollow elastic members 38 that penetrate along the vehicle up-down direction are provided within the concave portions 36B. Consequently, sound from the horns 34 can pass through the bumper absorber 36 through hollow portions 38A formed at the elastic members 38 (refer to arrows A).

Figure 6:
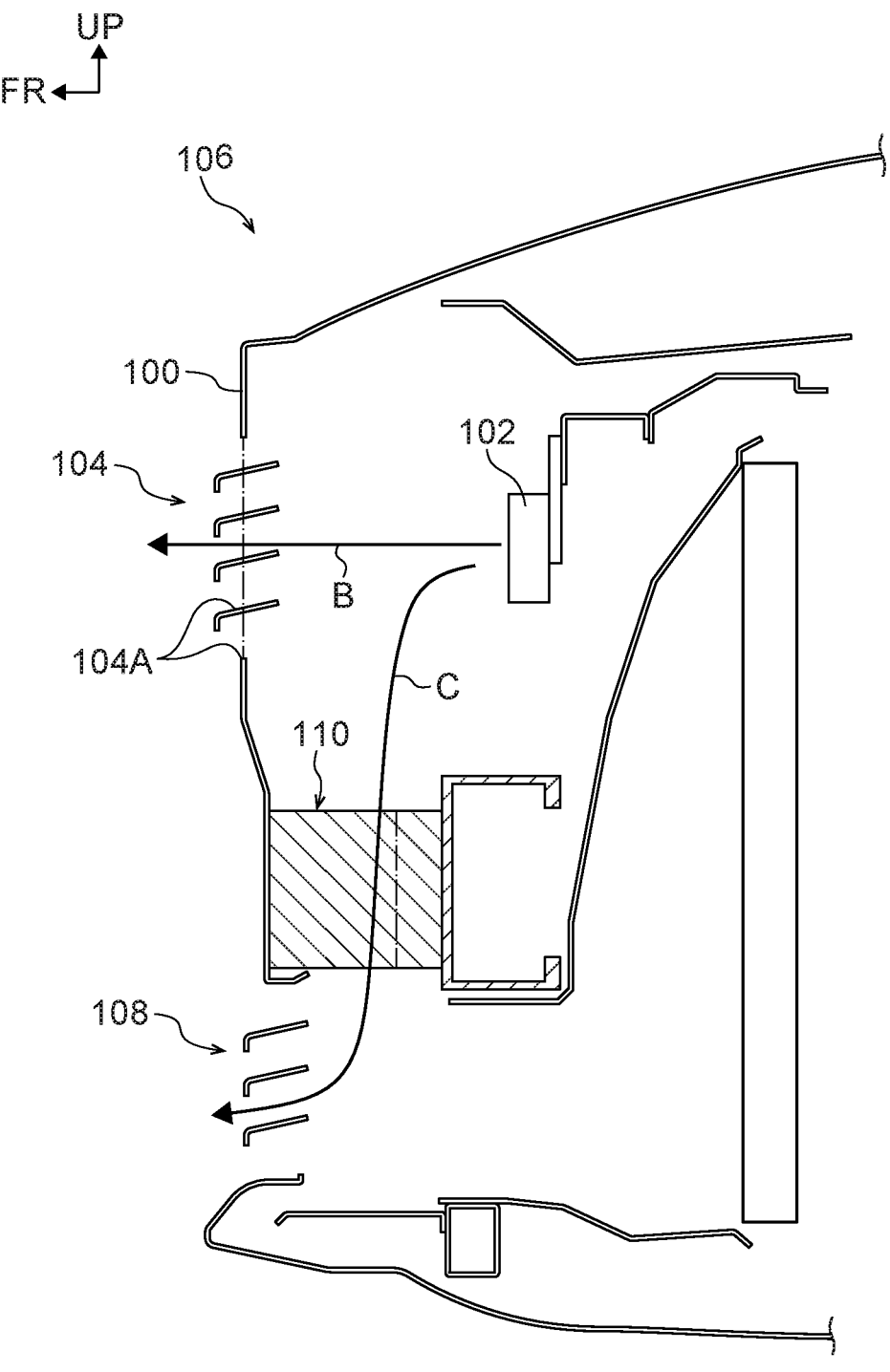
FIG. 6 is a schematic cross-sectional view corresponding to FIG. 1 and illustrating a comparative example.

As a comparative example, as illustrated in FIG. 6, in a vehicle 106 in which a so-called upper grill 104 is provided at a vehicle front side of a horn 102 at a bumper cover 100, for example, sound of the horn 102 is transmitted to a vehicle outside through opening portions 104A formed at the upper grill 104 (refer to arrow B).

On the other hand, although not illustrated in the drawings, in a vehicle such as a battery electric vehicle (BEV), a case is assumed in which the upper grill 104 is not provided, as indicated by the two-dot chain line in the bumper cover 100. In such a case, sound of the horn 102 is transmitted to the vehicle outside through opening portions 108A formed at a lower grill 108 (refer to arrow C), but a bumper absorber 110 is disposed between the horn 102 and the lower grill 108. Consequently, sound from the horn 102 is attenuated at a stage at which it passes through the bumper absorber 110, and sound pressure is reduced.

Accordingly, in order to assure sound pressure of the horn 102, it would be conceivable to secure a passage through which sound of the horn 102 passes, by reducing a cross-sectional area of the bumper absorber 110, as indicated by the two-dot chain line. In such a case, sound pressure of the horn 102 is assured, but since a stroke of the bumper absorber 110 is reduced, an impact energy absorption performance for absorbing impact energy is reduced.

In contrast thereto, in the present exemplary embodiment, as illustrated in FIGS. 2A and 2B, by providing the concave portions 36B that penetrate the bumper absorber 36 along the vehicle up-down direction, and providing the hollow elastic members 38 that penetrate along the vehicle up-down direction within the concave portions 36B, sound of the horn 34 is set so as to pass within the hollow portions 38A formed at the elastic members 38, and to be transmitted to the vehicle outside through the opening portions 16A formed at the grill 16.

Thus, in the present exemplary embodiment, by enabling sound of the horns 34 disposed at the vehicle upper side of the bumper absorber 36 to be transmitted through the opening portions 16A of the grill 16 disposed at the vehicle lower side of the bumper absorber 36, it becomes unnecessary to form the upper grill 104 (refer to FIG. 6) for transmitting sound of the horns 34, at the vehicle upper side of the bumper absorber 36. Namely, in the present exemplary embodiment, performance of the horns 34 can be secured without constraints being imposed on design due to forming the upper grill 104.

Further, although not illustrated in the drawings, due to the upper grill 104 (refer to FIG. 6) not being formed, components such as ducts that connect the opening portions 104A (refer to FIG. 6) of the upper grill 104 and the horns 34 or the like become unnecessary, and cost and vehicle body mass can be reduced. Furthermore, by eliminating the need for components such as the ducts or the like, a degree of freedom in layout when arranging other components can be improved.

Figure 3A:
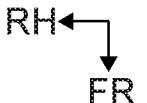
FIG. 3A is a plan view schematically illustrating a state before an impact load is input from a vehicle front side, in relevant portions of the vehicle to which the vehicle front section structure according to the present exemplary embodiment has been applied.
Figure 3A:
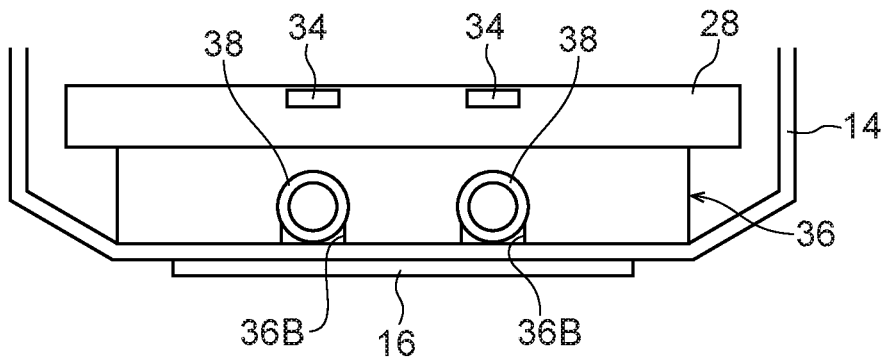
Figure 3B:
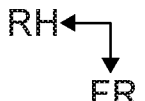
FIG. 3B is a plan view schematically illustrating a state after an impact load has been input from the vehicle front side, in relevant portions of the vehicle to which the vehicle front section structure according to the present exemplary embodiment has been applied.
Figure 3B:
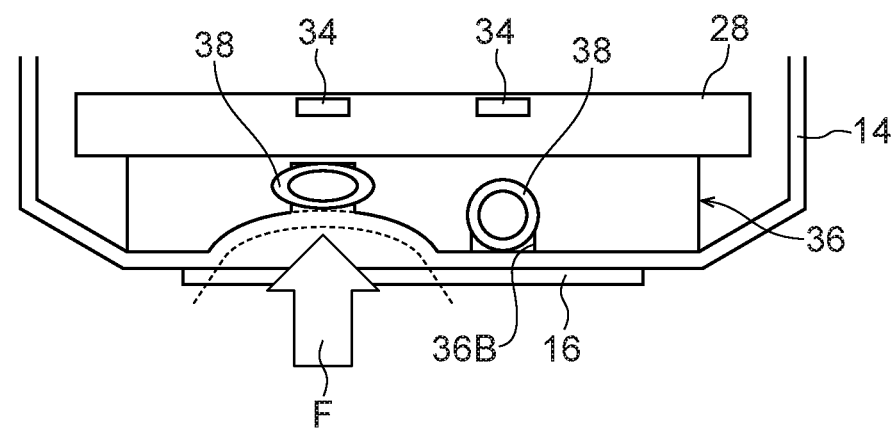
Figure 4:
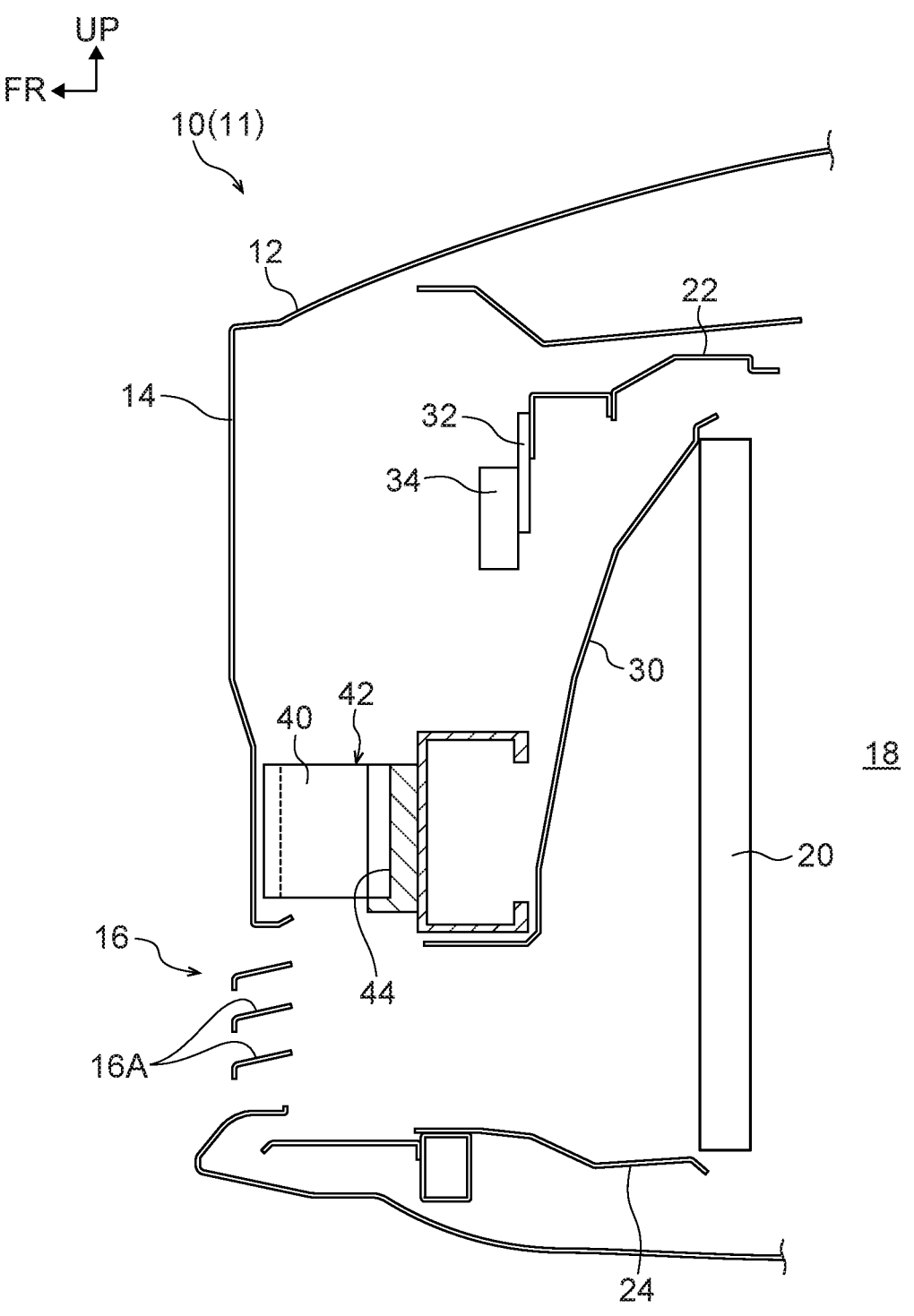
FIG. 4 is a schematic cross-sectional view corresponding to FIG. 1 and illustrating a modified example of the vehicle to which the vehicle front section structure according to the present exemplary embodiment has been applied.

Moreover, as illustrated in FIGS. 3A and 3B, in the present exemplary embodiment, within each concave portion 36B that penetrates the bumper absorber 36 along the vehicle up-down direction, a hollow elastic member 38 that penetrates along the vehicle up-down direction is provided, and the elastic member 38 absorbs a portion of impact energy due to an impact load F absorbed by the bumper absorber 36. It should be noted that FIG. 3A is a plan view schematically illustrating a state before the impact load F is input from the vehicle front side in relevant portions of the vehicle 11, and that FIG. 3B is a plan view schematically illustrating a state after the impact load F has been input from the vehicle front side in FIG. 3A.

In this regard, as described above, since the impact energy due to the impact load F input from the vehicle front side can be absorbed by the bumper absorber, if the concave portion 36B is formed in the bumper absorber 36, the stroke of the bumper absorber 36 is reduced by a corresponding amount, and there is a possibility that an absorption amount of the impact energy that can be absorbed will be reduced.

However, in the present exemplary embodiment, by providing the elastic member 38 within the concave portion 36B, a portion of the impact energy due to the impact load F input from the vehicle front side can be absorbed by deformation by the elastic member 38.

Namely, in the present exemplary embodiment, by providing the elastic member 38 within the concave portion 36B, and adjusting a so-called load-stroke relationship in the elastic member 38 according to a load-stroke relationship in the bumper absorber 36, the impact energy absorption amount that has been reduced due to formation of the concave portion 36B at the bumper absorber 36 can be supplemented.

Further, in the present exemplary embodiment, each elastic member 38 has a cylindrical shape. Consequently, for example, although not illustrated in the drawings, propagation efficiency of propagating sound of the horns 34 can be improved, compared to a case in which each elastic member 38 has a square tube shape. It should be noted that, although each elastic member 38 has a cylindrical shape in the present exemplary embodiment, there is no limitation thereto.

Figure 5A:
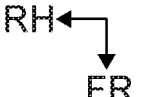
FIG. 5A is a plan view corresponding to FIG. 2A and schematically illustrating the modified example of the vehicle to which the vehicle front section structure according to the present exemplary embodiment has been applied.
Figure 5A:
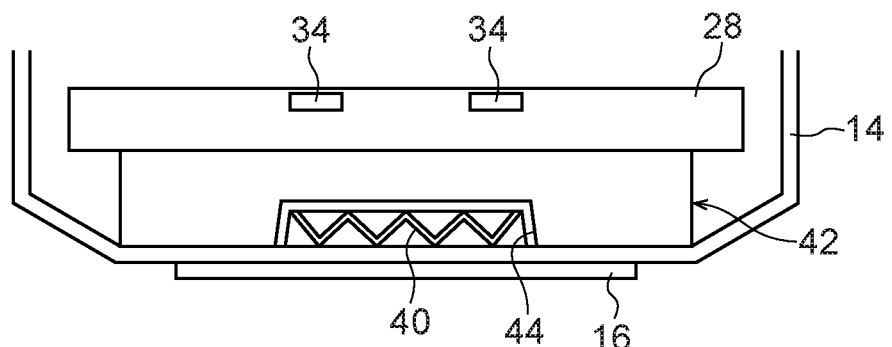
Figure 5B:
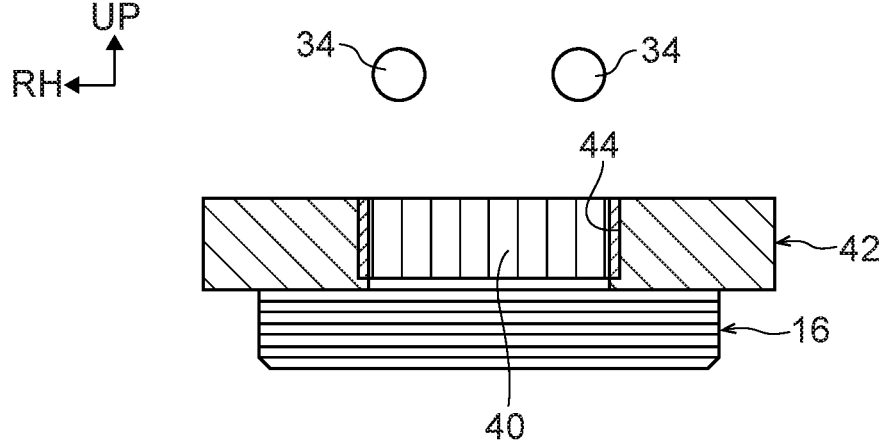
FIG. 5B is a plan view corresponding to FIG. 2B and schematically illustrating the modified example of the vehicle to which the vehicle front section structure according to the present exemplary embodiment has been applied.

For example, as illustrated in FIG. 5A, a hollow elastic body 40 having a zigzag shape, in which apexes are alternately provided at a front side and a rear side in plan view, may be provided at a front portion of the bumper absorber 42. A concave portion 44 that has a straight U-shape, in which a vehicle front side is open in a plan view, is formed at the front portion of the bumper absorber 42 in accordance with the shape of the elastic body 40.

Further, since it is sufficient that the elastic body has a hollow shape that penetrates along the vehicle up-down direction, a honeycomb shape, which is not illustrated in the drawings, may be employed instead. Although the load-stroke relationship of the elastic body can be adjusted by changing the shape of the elastic body in this manner, the load-stroke relationship may also be adjusted by changing a material of the elastic body itself.

Aside from this, the present disclosure may be implemented by carrying out various modifications in a range that does not depart from the spirit of the present disclosure. Furthermore, it is needless to say that the scope of rights of the present disclosure is not limited to the above-described exemplary embodiments or the above-described modified examples.

What is claimed is:

1. A vehicle front section structure comprising:

a horn, the horn being provided at a vehicle front section;

a bumper absorber, the bumper absorber being provided at a vehicle lower side of the horn and extending in a vehicle width direction, and the bumper absorber being capable of absorbing impact energy due to an impact load that has been input from a vehicle front side; and a grill, the grill being disposed at a vehicle lower side of the bumper absorber at a bumper cover configuring a design at a vehicle front end, and an opening portion being formed in the grill, wherein the bumper absorber is configured to include:

a through-hole, the through-hole penetrating along a vehicle up-down direction at a position overlapping with the opening portion in the vehicle width direction, and an elastic body, the elastic body being provided within the through-hole, and the elastic body having a hollow shape penetrating along the vehicle up-down direction.

2. The vehicle front section structure according to claim 1, wherein the elastic body is configured to be capable of absorbing a portion of the impact energy due to the impact load that has been input from the vehicle front side.

3. The vehicle front section structure according to claim 1, wherein the elastic body has a cylindrical shape.

4. The vehicle front section structure according to claim 1, wherein the through-hole is formed at a position overlapping with the horn in the vehicle width direction.

5. The vehicle front section structure according to claim 1, wherein a hollow portion of the elastic body is in communication with the opening portion.

6. The vehicle front section structure according to claim 1, wherein the elastic body is adhesively bonded to the bumper absorber.

7. The vehicle front section structure according to claim 1, wherein the through-hole has a U-shape in plan view, the U-shape opening toward the vehicle front side.

8. The vehicle front section structure according to claim 3, wherein the elastic body has a length in the vehicle up-down direction which is smaller than a length of the through-hole in the vehicle up-down direction, and a lower surface and an outer peripheral surface of the elastic body are in contact with an inner surface of the bumper absorber within the through-hole.

*  *  *  *  *